United States Patent Office.

DAVID BROOKS, JR., OF PHILADELPHIA, PENNSYLVANIA, ASSIGNOR TO THE ELECTRIC CABLE CONSTRUCTION AND MAINTENANCE COMPANY, OF SAME PLACE.

COVERING FOR ELECTRIC WIRES AND CABLES.

SPECIFICATION forming part of Letters Patent No. 383,098, dated May 22, 1888.

Application filed December 4, 1886. Renewed March 3, 1888. Serial No. 266,101. (No specimens.)

*To all whom it may concern:*

Be it known that I, DAVID BROOKS, Jr., a citizen of the United States, residing in the city and county of Philadelphia, State of Pennsylvania, have invented a new and useful Improvement in Air-Tight Coverings for Electric Wires and Cables, which improvement is fully set forth in the following specification.

In carrying out my invention I take fibrous-covered wires and saturate them with an insulating compound. The wires are then reeled, after which they are unwound from the reel, and as they run off from the reel plastic rubber is wrapped or forced around the wires with interlying wrappings of canvas and a proper portion of powdered sulphur. The cable as constituted is then coiled in a vulcanizing-furnace and subjected to a heat of about 265° Fahrenheit for a length of time sufficient to vulcanize it to the proper hardness.

I am aware that it is common in covering electric wires to wrap the same in strips of metal and vulcanized rubber; also, to envelop the wire with water-proof wrapping and cover the same with tin-foil or other pliable metal and an insulating vulcanized-rubber preparation, and such I do not claim; but I am not aware that it is old to first cover the wire with a fibrous tape saturated with an insulating compound, and then, after unreeling the wires, to inclose the same in a plastic rubber mixture with interlying wrappings of canvas and a quantity of powdered sulphur, the rubber being then vulcanized, as herein set forth.

Having thus described my invention, what I claim as new, and desire to secure by Letters Patent, is—

1. The process of covering electric wires, consisting in first covering the wires with a fibrous tape saturated with an insulating compound, then inclosing the same in a plastic rubber preparation with interlying canvas wrappings and powdered sulphur, and then placing the wires thus covered in a vulcanizing-furnace and subjecting the same to a heat of 265° Fahrenheit until the rubber is vulcanized, all substantially as described.

2. An electric cable formed of wires covered with fibrous material saturated with an insulating compound and a vulcanized-rubber coating with interlying canvas wrappings, all substantially as and for the purpose set forth.

3. An electric cable consisting of wires each of which is covered with a wrapping of fibrous material saturated with an insulating composition, the whole covered with layers of vulcanized rubber and canvas, all substantially as described.

DAVID BROOKS, JUNR.

Witnesses:
JOHN A. WIEDERSHEIM,
A. P. GRANT.